United States Patent [19]
Clapham

[11] 3,775,249
[45] Nov. 27, 1973

[54] NUCLEAR REACTOR FUEL ELEMENTS
[75] Inventor: Leslie Clapham, Blackpool, England
[73] Assignee: United Kingdom Atomic Energy Authority, London, England
[22] Filed: Oct. 26, 1971
[21] Appl. No.: 192,215

[30] Foreign Application Priority Data
Oct. 29, 1970   Great Britain............... 51,595/70

[52] U.S. Cl. .................................................. 176/78
[51] Int. Cl. .......................................... G21c 3/32
[58] Field of Search ............... 176/78; 151/5, 41.71

[56] References Cited
UNITED STATES PATENTS

| | | | |
|---|---|---|---|
| 3,287,231 | 11/1966 | Frisch .................................. | 176/78 |
| 3,425,908 | 2/1969 | Rouge et al........................... | 176/78 |
| 909,268 | 1/1909 | Windle................................. | 151/5 UX |
| 620,812 | 3/1899 | Ward .................................... | 151/5 |
| 463,650 | 11/1891 | Stevens................................ | 151/5 X |

*Primary Examiner*—Reuben Epstein
*Attorney*—Roberts B. Larson et al.

[57] ABSTRACT

The invention relates to a nuclear reactor fuel element assembly which is in the form of a bundle of parallel fuel pins extending between top and bottom end fittings in the assembly. The top and bottom end fittings are held together by a number of lifting pins which are screwed into the bottom end fitting and have spigots extending through the top end fitting and fitted with retaining nuts. A fuel pin locking member consists of a U-shaped split pin having its legs extending through transverse drillings in the retaining units and spigots of two adjacent pins. Thus the retaining nut of each pin is locked to the spigot and the locking member prevents relative rotation between the pins and hence prevents unscrewing of the pins from the bottom end fitting.

1 Claim, 3 Drawing Figures

NUCLEAR REACTOR FUEL ELEMENTS

BACKGROUND OF THE INVENTION

This invention relates to nuclear reactor fuel element assemblies and in particular to that kind of fuel element assembly comprising a plurality of transversely spaced elongate fuel pins supported in a bundle with their longitudinal axes parallel.

The bundle of fuel pins is generally contained in an open ended tubular wrapper with the fuel pins extending between upper and lower end fittings in the wrapper. The fuel pins may also be supported at points intermediate their ends by spacer grids which serve to retain the correct lateral location of the fuel pins in the assembly relative to one another.

Usually in this type of fuel element assembly the ends of the fuel pins are a sliding fit in apertures in the upper and lower end fittings, thus allowing for longitudinal thermal expansion of the fuel pins on rise from ambient to operating temperature in use of the fuel element assembly in a nuclear reactor. However a small number of the fuel pins may be attached at their ends to the upper and lower end fittings thus connecting the end support grids together in the wrapper. In a particular arrangement these fuel pins have longitudinally extending end spigots which engage with apertures in the upper and lower end fittings. The end spigots at the lower ends of the fuel pins are screwed into the apertures in the lower end fitting. The end spigots at the upper ends of the fuel pins extend through the apertures in the upper end fitting and are threaded for retaining nuts which attach the fuel pins to the upper end fitting.

A problem arises in use of such a fuel element assembly in a nuclear reactor. Due to vibration of the fuel element assembly in use unscrewing of the fuel pins from the apertures in the lower end fitting can occur. Also unscrewing of the retaining nuts on the threaded spigots at the upper ends of the fuel pins can occur.

It is an object of the present invention to provide locking means serving the dual function of preventing such unscrewing of the fuel pins from the lower end fitting and unscrewing of the retaining nuts on the threaded spigots at the upper ends of the fuel pins.

SUMMARY OF THE INVENTION

According to the present invention there is provided a fuel pin locking member for a nuclear reactor fuel element assembly of the kind comprising a plurality of transversely spaced elongated fuel pins with the fuel pins extending between upper and lower end fittings in the assembly, an adjacent pair of fuel pins having their ends screwed into the end fitting at one end of the assembly and the other ends of the pair of fuel pins extending through apertures in the second end fitting at the other end of the assembly, said other ends being in screwed threaded engagement with nuts, said fuel pin locking member being in the form of a U-shaped split pin having bifurcated arms extending through corresponding transverse drillings in each of the nuts and the ends of the fuel pins within the nuts, thereby to prevent both unscrewing of the nuts from the ends of the fuel pins and the rotation of the fuel pins relative to one another.

DESCRIPTION OF THE DRAWINGS

One embodiment of the invention will now be described by way of example with reference to the accompanying drawings in which.

DESCRIPTION OF THE PREFERRED EMBODIMENT

Figure 1:
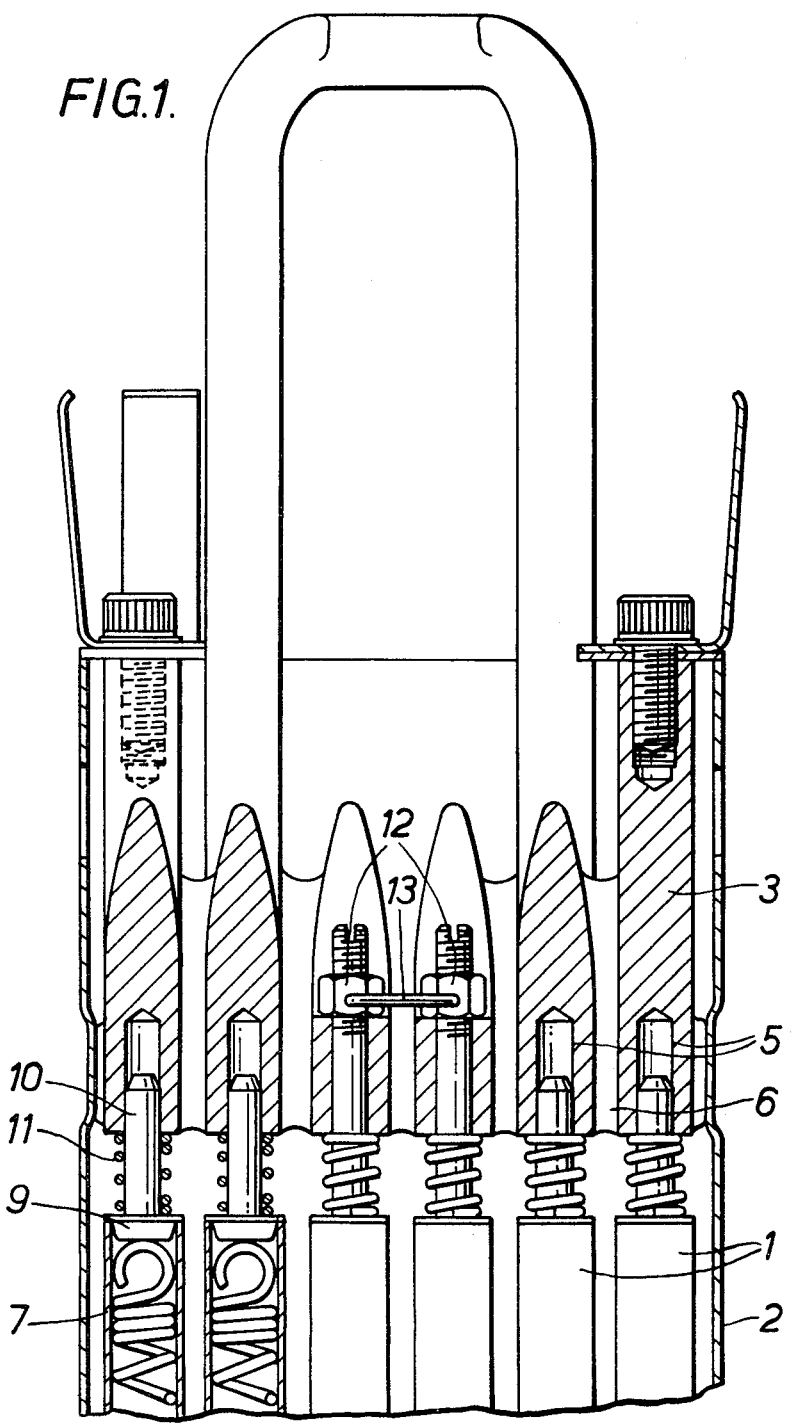
FIGS. 1 and 2 are longitudinal sectional elevations of the upper and lower ends of a nuclear reactor fuel element assembly.
Figure 2:
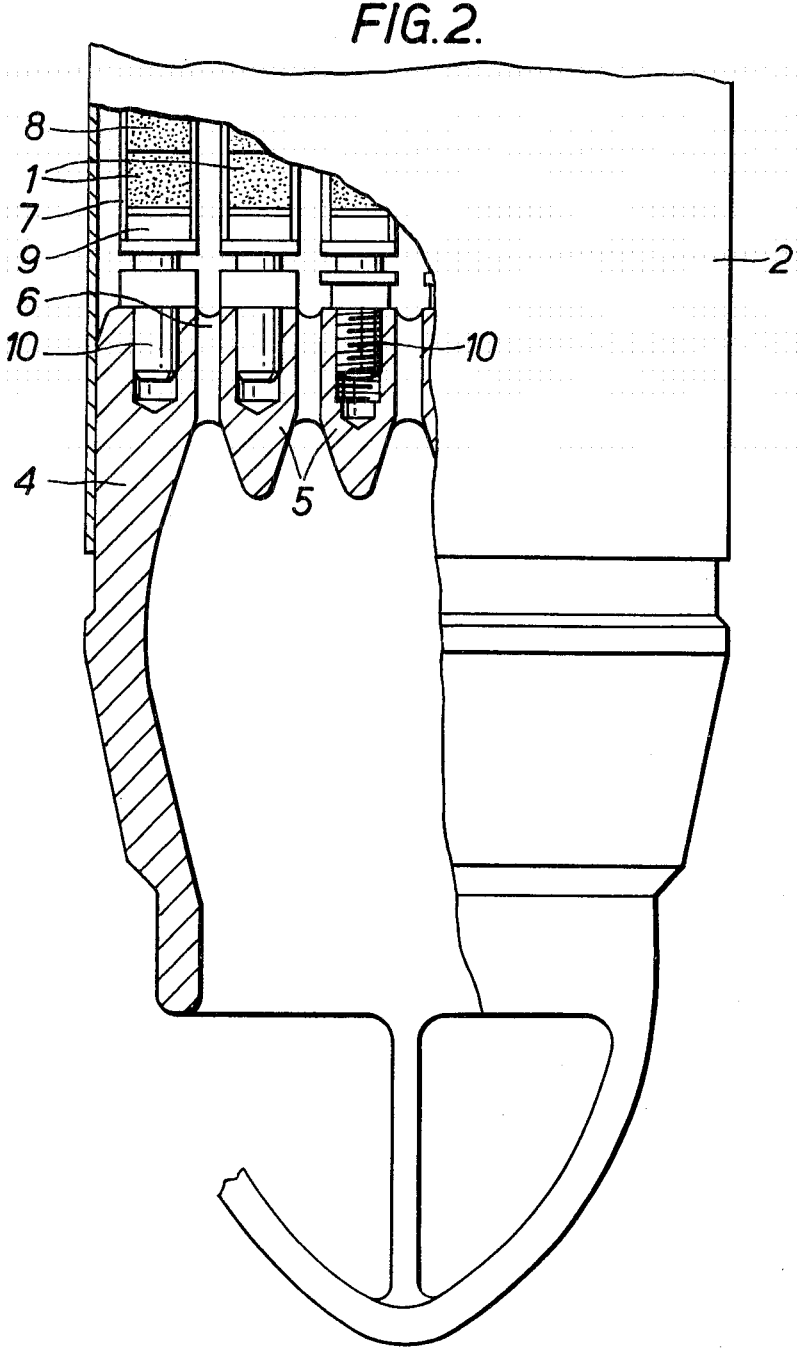
Figure 3:
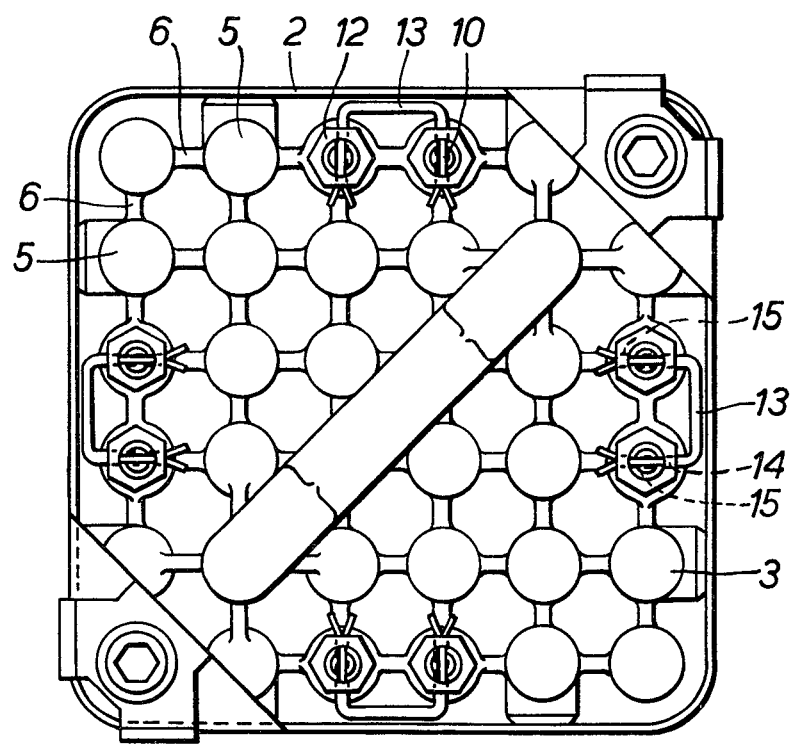
FIG. 3 is a plan view of the fuel element assembly shown in FIGS. 1 and 2.

The nuclear reactor fuel element assembly shown in the drawings comprises a bundle of transversely spaced cylindrical fuel pins 1 arranged with their longitudinal axes parallel. The fuel pins 1 extend inside a tubular wrapper 2 between an upper end fitting 3 and a lower end fitting 4, located at the ends of the tubular wrapper 2.

Both the upper and lower end fittings 3 and 4 comprise a series of tubular bosses 5 joined by transverse webs 6. The fuel pins 1 each comprise a tubular metal sheath 7 containing fissionable fuel material such as pellets 8 of uranium dioxide. The sheaths 7 of the fuel pins 1 are closed at each end by end caps 9 which have integral spigots 10. The spigots 10 at the lower ends of the fuel pins 1 fit in the tubular bosses 5 in the lower end fitting 4. The spigots 10 at the upper ends of the fuel pins 1 are a sliding fit in the bosses 5 in the upper end fitting 4. Compression springs 11 are provided on the spigots 10 at the upper ends of the fuel pins acting between the upper end fitting 4 and the shoulders of the end caps 9 at the upper ends of the fuel pins 1.

Two adjacent fuel pins 1 on each of the four sides of the fuel assembly have the spigots 10 at their lower ends threaded and screwed into the corresponding bosses 5 in the lower end fitting 4. The spigots 10 at the upper ends of these fuel pins 1 extend through the corresponding bosses 5 in the upper end fitting 3, the ends of the spigots 10 projecting above the bosses 5 in the upper end fitting 3 being threaded and fitted with retaining nuts 12. A locking device in the form of a U-shaped split pin 13 has its arms 14 fitted through transverse drillings 15 in the retaining nuts 12 and spigots 10 of each adjacent pair of fuel pins 1.

The split pins 13 perform two functions. Firstly in use of the fuel element unscrewing of the retaining nuts 12 from the spigots 10 of the fuel pins due to vibration of the fuel element assembly is prevented by the split pins 13. Also the split pins 13 prevent bodily rotation of the adjacent fuel pins 1 in each pair and thus prevent unscrewing of the threaded spigots 10 at the lower ends of the fuel pins from the bosses 5 in the lower end fittings 4.

I claim:

1. A fuel pin locking member for a nuclear reactor fuel element assembly of the kind comprising a plurality of transversely spaced elongated fuel pins with the fuel pins extending between upper and lower end fittings in the assembly, an adjacent pair of fuel pins having their ends screwed into the end fitting at one end of the assembly and the other ends of the pair of fuel pins extending through apertures in the second end fitting at the other end of the assembly, said other ends being in screw threaded engagement with nuts, said fuel pin locking member being in the form of a U-shaped split pin having bifurcated arms extending through corresponding transverse drillings in each of the nuts and the ends of the fuel pins within the nuts thereby to prevent both unscrewing of the nuts from the ends of the fuel pins and the rotation of the fuel pins relative to one another.

* * * * *